T. D. WARE.
INSECT DESTROYER.
APPLICATION FILED JAN. 19, 1910.
1,007,620.
Patented Oct. 31, 1911.
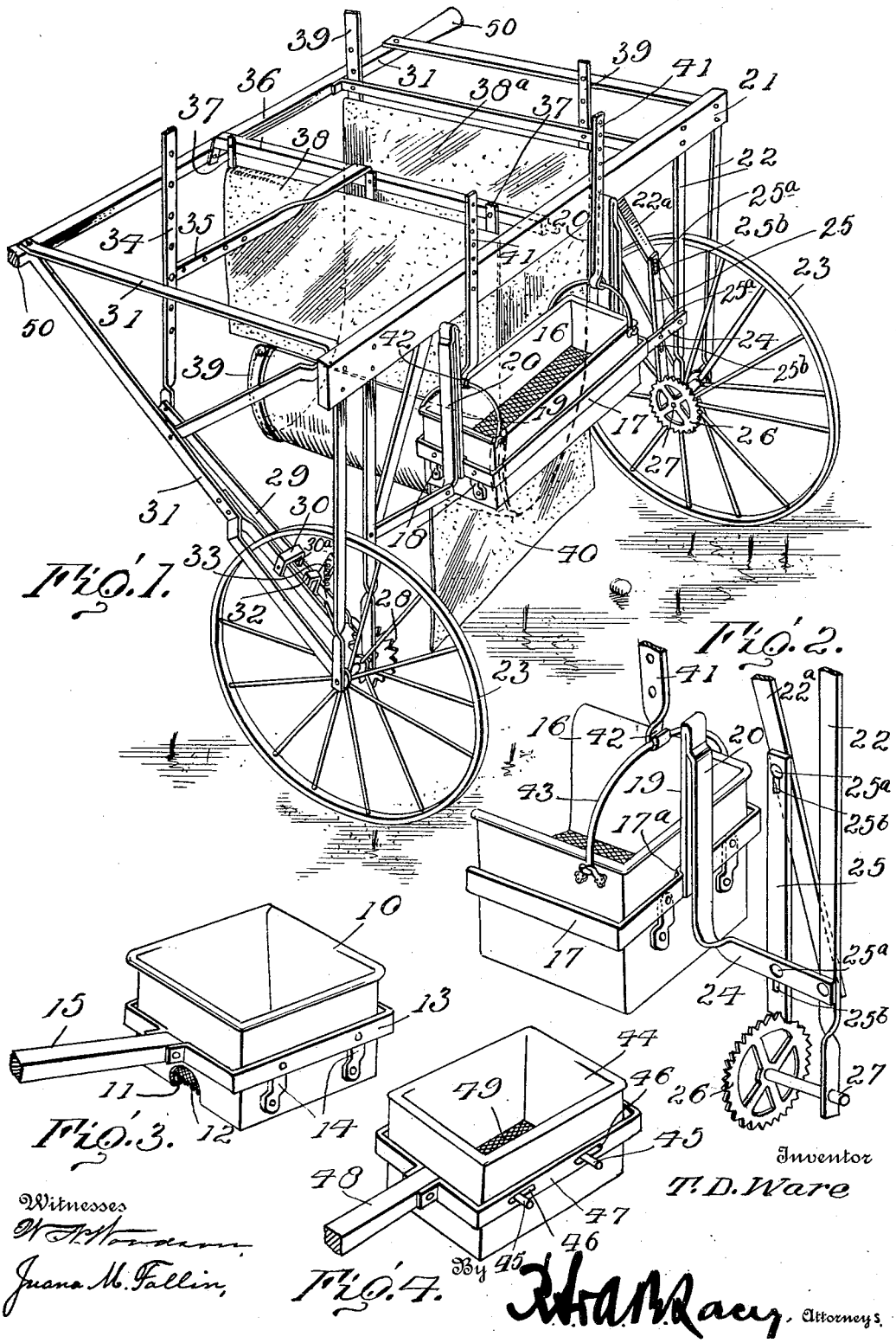
Witnesses
Inventor
T. D. Ware
By ........., Attorneys

UNITED STATES PATENT OFFICE.

THOMAS D. WARE, OF CHICAGO, ILLINOIS.

INSECT-DESTROYER.

1,007,620.  Specification of Letters Patent.  Patented Oct. 31, 1911.

Application filed January 19, 1910. Serial No. 538,932.

*To all whom it may concern:*

Be it known that I, THOMAS D. WARE, a citizen of the United States, residing at Chicago, in the county of Cook and State of Illinois, have invented certain new and useful Improvements in Insect-Destroyers, of which the following is a specification.

This invention relates to insect destroyers and refers particularly to a device for spreading a powder or the like over the plants which are infected.

The invention has for an object a specific form of device wherein the powder is automatically distributed and caused to feed regularly as the receptacle or container, which carries the insecticide, is carried or conveyed over the rows of plants.

This invention has for another object the provision of a machine for striking and vibrating plants to remove insects therefrom, and the machine is provided with an adjustable receiver to catch the insects as they are thrown from the plants.

The invention has for a further object the provision of an improved machine or implement for carrying the container and for vibrating the same to produce the feeding of the powder therefrom.

This invention still further contemplates the provision of a mechanism whereby the vibrating members for shaking the plants may be independently operated from the pulverulent distributer, or may be operated in conjunction therewith.

For a full understanding of the invention reference is to be had to the following description and accompanying drawing in which:—

Figure 1 is a perspective view of the improved machine having the container applied thereto. Fig. 2 is a detail perspective view of the vibrating mechanism employed. Fig. 3 is a perspective view of the container disclosing a handle applied thereto, and Fig. 4 is a slightly modified form of the container and actuating means.

Corresponding and like parts are referred to in the following description and indicated in all the views of the accompanying drawing by the same reference characters.

Referring to the drawing the numeral 10 designates the container which is formed preferably from sheet metal bent to provide a rectangular receptacle and having at its lower edge an inturned flange 11 for the reception of the perforated bottom 12. The bottom 12 is loosely disposed in the container 10 and rests upon the flange 11 to enable the withdrawing of the bottom 12 to replace the same with bottoms having perforations varying in size to accommodate the container to various forms of insecticides.

Arranged about the container 10 is a rectangular frame 13 which is formed from strap metal and having such dimensions that the frame 13 is normally spaced from the outer walls of the container 10 to admit of a limited vibratory movement of the container 10 within the frame 13. Links 14 are pivotally secured at their lower ends to the oposite sides of the container 10 and are diverged upwardly from such sides to engage against the inner faces of the side-bars of the frame 13. The upper ends of the links 14 are pivotally secured upon the frame 13 to admit of the swinging of the container 10 within the frame 13. As disclosed in Fig. 3 the frame 13 is supported at one end upon a handle 15 which extends backwardly therefrom.

When the container 10 is to be carried and actuated by a machine, as is disclosed in Figs. 1 and 2, the following construction of machine and elements are employed. In this instance the container 16 is elongated and is supported in a correspondingly formed frame 17 by links 18 positioned at the opposite ends of the container 16 and frame 17, the frame 17 being adjustably secured upon the lower ends of straps 19. The frame 17 is provided with offset portions 17ª at its opposite ends, as can be readily seen from Fig. 2, which extend inwardly and slidably receive the lower ends of the straps 19 to admit of the vertical adjustment of the container 16 and at the same time to prevent the lateral vibration of the frame 17 independently of the straps 19. The straps 19 are rigidly secured at their upper ends upon uprights 20 which are suported at the opposite ends of the frame 17. The straps 19 are preferably integrally formed with the uprights 20, as can be seen from Fig. 2, by elongating the uprights 20 and bending the same downwardly and inwardly to engage in the offset portions 17ª. The machine is provided with a cross-bar 21 above the container 16 which carries depending standards 22 upon the lower ends of which are mounted the supporting wheels 23.

Referring particularly to Fig. 2 the inner standard 22 at one side of the machine is provided with an arm 24 which extends inwardly from the standard 22 and supports the lower end of the pawl 25. The pawl 25 extends below the arm 24 and engages with the teeth of a tappet wheel 26 which is mounted rigidly upon the axle 27 which supports the adjacent wheel 23. The pawl 25 comprises a length of flattened metal which is supported at its upper end upon a brace 22$^a$ and at its lower end upon the arm 24. The pawl 25 is provided with two elongated slots 25$^b$ to receive clamping bolts 25$^a$ which are carried upon the brace 22$^a$ and the arm 24. The slots 25$^b$ are provided for the purpose of admitting of the adjustment of the pawl 25 relative to the tappet wheel 26 to regulate the oscillation of the frame 17 and in order to throw the same entirely out of operation. The arm 24 is preferably a continuation of the upright 20 and strap 19. The arm 24 is secured at its inner end to the adjacent upright 20 and, by reason of its connection with the pawl 25, vibrates the same. This vibratory movement is communicated to the strap 19 which oscillates the frame 17 and causes the striking of the container 16 against the opposite sides thereof. The frame 17 of the machine is further provided, at its opposite side, with a second tappet wheel 28 which is in a like manner mounted upon the axle which supports the adjacent wheel 23. The tappet wheel 28 strikes the outer end of a lever 29 which is pivotally supported as at 30$^a$ upon a bracket 30 inwardly extending from the main frame 31 of the machine. The lever 29 is provided at a point between the bracket 30 and the outer end thereof with a guide 32 which is carried by the frame 31 and which receives therein the outer end of the lever 29 to offset the lateral vibration thereof. The forward cross-bar of the frame 31 projects beyond the sides of the frame to form handles 50 by means of which the device is adapted to be drawn. The guide 32 is extended at one side considerably above the edge of the lever 29 and carries a depending spring 33 which is connected at its lower end to the lever 29 to engage the outer end of the lever 29 against the teeth of the tappet wheel 28. The forward end of the lever 29 is connected to links 34 and 35 which are adjustably secured to one another and connect the lever 29 with a rocker-bar 36 which is longitudinally positioned within the frame 31, having its rear end pivotally mounted at the central portion of the bar 21. Spaced fingers 37 depend from the bar 36 and carry thereon a strip or sheet of canvas 38, or like flexible material. At the side of the frame 31 opposite to the lever 29 a receiver 38$^a$ is disposed which is formed of a frame 39 of strap metal curved at its lower end to form a receptacle which is disposed adjacent to and spaced outwardly from the lower edge of the flexible strip 38. For the purpose of deflecting the plants which pass beneath the container 16, a flexible sheet 40 depends from the inner edge of the container 16 for engagement against the plants to bend the same downwardly and to admit of the sprinkling of the powder thoroughly over the same. The sheet 40 is of such a length as to strike the upper ends of the plants only and to bend the same forwardly so as to expose the lower leaves of the plants to the falling insecticide. The sheet 40 offers considerable resistance, by reason of its weight and stiffness, and is therefore only slightly bent backwardly by the resistance of the plants, the backward movement of the sheet 40 being sufficient only to receive a small portion of the insecticide. For the purpose of supporting the container 16 within the frame 17 and to admit of the vibration of the same, straps 41 are suitably secured in spaced relation against the rear face of the transverse bar 21 and are provided with hooks 42 at their lower ends to loosely receive bails 43 which are hingedly mounted against the forward and rear faces of the container 16 adjacent the opposite ends of the same.

In the modifications disclosed in Fig. 4, the container 44 is provided with laterally extending studs 45 which project through elongated slots 46 formed in the rectangular frame 47. In this latter construction as the frame 47 is vibrated, through the medium of a suitable handle 48 the container 44 is reciprocated therein and supported upon the frame 47 through the medium of studs 45. As the container 44 strikes the opposite ends of the frame 47 the jar incident to such striking causes the settling of the powder within the container 44 and thereby forces the same through the perforated bottom 49. A similar operation takes place in the construction disclosed in Fig. 3 wherein when the frame 13 is reciprocated, the container 10 is caused to strike the opposite ends of the frame 13 and to settle the powder. The links 14 form a hinged connection wherein a slight upward movement is imparted to the container 10 at the end of the stroke.

When the machine is employed the same is drawn over a number of plants which pass between the receiver 38$^a$ and the flexible sheet 38. As the wheel 23 rotates the tappet wheel 28 is carried therewith and the lever 29 is vibrated to rock the bar 36. The bar 36 swings the fingers 37 and causes the striking of the sheet 38 against the plants to jar the same in the direction of the receiver 38$^a$ into which the insects upon the plants are thrown. The links 34 and 35, connecting the bar 36 to the lever 29, can be adjusted by positioning the pin 34ª in the registering apertures in the links to regulate the spacing of the lower ends of the fingers 37 from the receiver 38ª. The fingers 37 may be made in any desired length to produce the desired movement of the vibrating sheet 38. Further movement of the machine causes the striking of the sheet 40 against the plants, and owing to the weight and the resistance of the same, the plants are bent forwardly and downwardly to receive an amount of the insecticide which is simultaneously fed from the container 16. As the opposite wheel 23 is rotated the tappet wheel 26 strikes the pawl 25 and vibrates the bracket 20 whereupon the strap 19 is given a vibratory movement to reciprocate the frame 17 and to cause the striking of the same alternately against the sides of the container 16 to jar the same and settle the powder upon the bottom of the container 16. If desired the pawl 25 may be raised out of the path of the teeth of the tappet wheel 26 to throw the container 16 out of operation. In this instance the vibrating mechanism alone operates to remove the insects from the plants and the machine can be thus used with a saving of the insecticide.

Having thus described the invention what is claimed as new is:—

1. A powder duster including a frame, a receptacle hingedly mounted for vertical adjustment upon the frame, a vibrating frame loosely fitting about the receptacle and having inwardly offset portions at its opposite sides, vertical vibrating straps carried upon the frame and slidably engaging against the offset portions of the vibrating frame to move the same, and hinged links disposed between the receptacle and the vibrating frame for supporting the latter.

2. A powder duster including a main frame, a receptacle hinged upon the main frame for vertical adjustment, a loose frame surrounding the receptacle, vertical straps slidably engaging against the sides of the loose frame for vibrating the same, operating means disposed upon the main frame and having connection with the vertical straps, and supporting means disposed between the receptacle and the loose frame for supporting the latter between the vertical straps.

In testimony whereof I affix my signature in presence of two witnesses.

THOMAS D. WARE. [L. S.]

Witnesses:
 O. H. TRAMBLAY,
 O. D. BUSH.

---

Copies of this patent may be obtained for five cents each, by addressing the "Commissioner of Patents, Washington, D. C."